(12) United States Patent
Hamberger et al.

(10) Patent No.: US 9,177,470 B2
(45) Date of Patent: Nov. 3, 2015

(54) METHOD FOR WARNING A DRIVER OF A VEHICLE ABOUT EXCEEDING OF A SPEED LIMIT, AND VEHICLE

(71) Applicant: AUDI AG, Ingolstadt (DE)

(72) Inventors: Werner Hamberger, Lenting (DE); Kati Schulz, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 157 days.

(21) Appl. No.: 14/067,193

(22) Filed: Oct. 30, 2013

(65) Prior Publication Data

US 2014/0118169 A1 May 1, 2014

(30) Foreign Application Priority Data

Oct. 30, 2012 (DE) .......................... 10 2012 021 419

(51) Int. Cl.
| | |
|---|---|
| *G08G 1/01* | (2006.01) |
| *G08G 1/052* | (2006.01) |
| *B60K 31/18* | (2006.01) |
| *G08G 1/0962* | (2006.01) |
| *G08G 1/0967* | (2006.01) |

(52) U.S. Cl.
CPC ................. *G08G 1/052* (2013.01); *B60K 31/18* (2013.01); *G08G 1/09623* (2013.01); *G08G 1/09626* (2013.01); *G08G 1/096716* (2013.01); *G08G 1/096775* (2013.01); *G08G 1/096791* (2013.01)

(58) Field of Classification Search
CPC ............. G08G 1/052; G08G 1/096775; G08G 1/096716; G08G 1/096791; G08G 1/09626; G08G 1/09623; B60K 31/18; B60K 31/00

USPC ........... 340/936, 905, 466, 441, 426.19, 988, 340/989, 901, 902, 992, 993, 539.1; 701/213, 23, 119; 180/171, 170, 271, 180/275
See application file for complete search history.

(56) References Cited

U.S. PATENT DOCUMENTS

| | | | | |
|---|---|---|---|---|
| 5,819,198 | A * | 10/1998 | Peretz ........................... | 701/117 |
| 6,864,784 | B1 * | 3/2005 | Loeb ............................. | 340/441 |

(Continued)

FOREIGN PATENT DOCUMENTS

| | | |
|---|---|---|
| CN | 1941022 | 4/2007 |
| CN | 101385057 | 3/2009 |

(Continued)

OTHER PUBLICATIONS

German Office Action for German Priority Patent Application No. 102012021419.7, issued Nov. 29, 2012, 11 pages.

(Continued)

*Primary Examiner* — Anh V La
(74) *Attorney, Agent, or Firm* — Staas & Halsey LLP

(57) ABSTRACT

A method warns a driver of a vehicle about exceeding of a speed limit. First of all, it is determined whether a speed limit is present and what the driving speed of the vehicle is. If the driving speed of the vehicle is greater than the driving speed which is permissible according to the speed limit, a warning signal of a first type is emitted. Subsequently, the reaction of the driver to the warning signal of the first type is determined. A warning signal of a second type is emitted in a time-delayed manner, or the emitting of the warning signal of the second type is suppressed, depending on the reaction of the driver to the warning signal of the first type. A vehicle carries out a method of this type.

13 Claims, 1 Drawing Sheet

(56) References Cited

U.S. PATENT DOCUMENTS

| | | | |
|---|---|---|---|
| 7,394,401 B2* | 7/2008 | De Wilde et al. | 340/936 |
| 7,671,727 B2* | 3/2010 | Flick | 340/466 |
| 2005/0083211 A1 | 4/2005 | Shafir et al. | |
| 2005/0264404 A1* | 12/2005 | Franczyk et al. | 340/441 |
| 2007/0198160 A1 | 8/2007 | Sheynblat | |
| 2007/0236342 A1* | 10/2007 | Hines et al. | 340/438 |
| 2010/0316255 A1 | 12/2010 | Mathony et al. | |

FOREIGN PATENT DOCUMENTS

| | | |
|---|---|---|
| DE | 19952392 | 5/2001 |
| DE | 10130060 | 1/2003 |
| DE | 112006002262 | 6/2008 |
| DE | 102006056444 | 7/2008 |
| DE | 102008036301 | 4/2009 |
| DE | 102007058542 | 6/2009 |
| DE | 102008020488 | 11/2009 |
| DE | 102008040982 | 2/2010 |
| DE | 102012021419 | 10/2012 |
| WO | 2007/024365 | 3/2007 |

OTHER PUBLICATIONS

German Decision to Grant for German Priority Patent Application No. 102012021419.7, issued Mar. 21, 2013, 11 pages.

Chinese Office Action issued May 5, 2015 in Chinese Patent Application No. 201310521577.2.

* cited by examiner

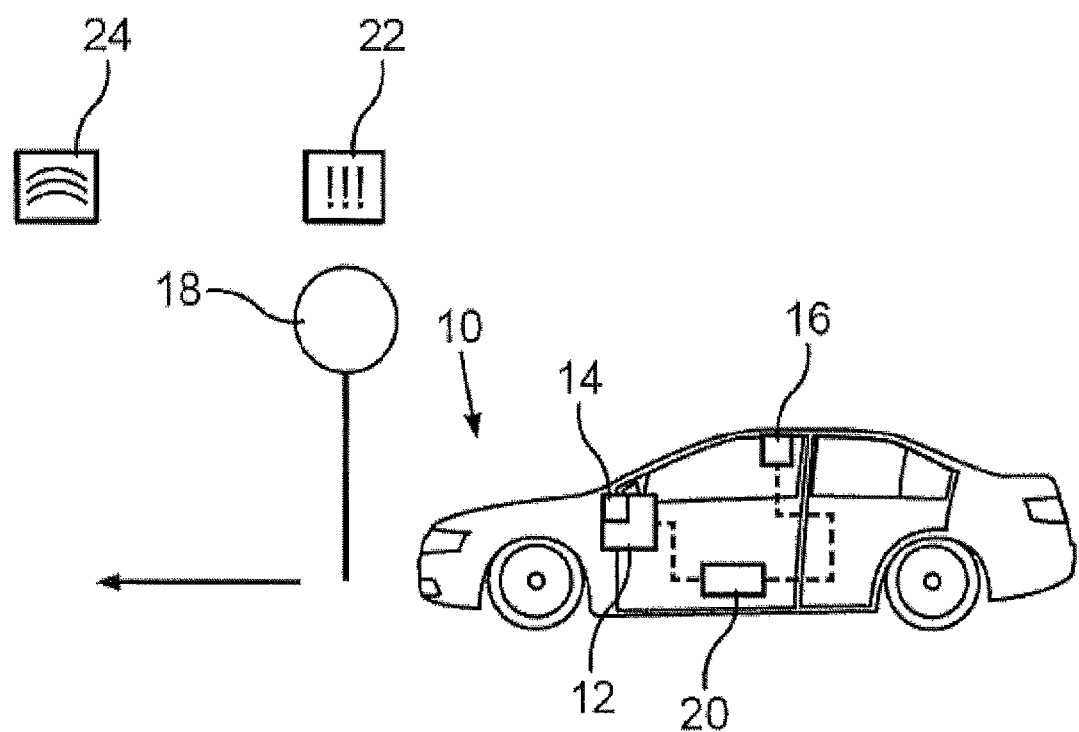

METHOD FOR WARNING A DRIVER OF A VEHICLE ABOUT EXCEEDING OF A SPEED LIMIT, AND VEHICLE

CROSS REFERENCE TO RELATED APPLICATIONS

This application is based on and hereby claims priority to German Application No. 10 2012 021 419.7 filed Oct. 30, 2012, the contents of which are hereby incorporated by reference.

BACKGROUND

The invention relates to a method for warning a driver of a vehicle about exceeding of a speed limit.

DE 10 2008 040 982 A1 describes a driver information apparatus for the anticipatory warning of the driver of a vehicle in the case of excessive speed. Here, first of all, a speed limit and a driving speed of the vehicle are determined. Before the start of the speed limit, a braking recommendation is emitted as warning signal of a first type if the vehicle speed is greater than the maximum speed which will soon be permissible. If the driver brakes, an information item that the speed limit is present at a defined distance is displayed before the start of the speed limit. The valid speed limit is then displayed as information item from the start of the speed limit. If, in contrast, the driver does not brake or does not brake sufficiently, a warning which states that the current speed is too high and that braking has to be carried out is emitted as warning signal of a second type.

US 2005/0083211 A1 describes a system in a vehicle, which system is designed for discerning traffic signs on a driving route and warning a driver if there is a significant traffic sign on the driving route ahead. In order to update map data of the system with the positions of traffic signs, a transceiver of the system can wirelessly receive updated information. Corresponding information can also be exchanged with other vehicles via the transceiver.

WO 2007/024 365 A1 describes a navigation system for a vehicle, which navigation system is capable of comparing a current state of the vehicle and an imminent state. If said states do not coincide, the driver is warned. A two-stage alarm can be emitted here, for example first of all the advice "caution" and then "warning".

DE 101 30 060 A1 describes the emitting of a warning which can be discerned visually or an acoustic warning signal if a speed limit is exceeded. A warning device is actuated if a receiver which is attached to the motor vehicle receives a signal from a transmitter which is attached to a traffic sign and the driving speed is greater than it should be on the basis of the signal. The warning device can be switched off temporarily by the driver of the motor vehicle. After a predefined time period, the warning device is actuated again if the driver still not the maximum speed.

DE 199 52 392 A1 describes a method for providing warning information which is dependent on the driving route to the driver of a motor vehicle, in which method the aim is to safely drive along a driving route lying in front of the vehicle at an adapted speed. The driver is warned, for instance, before driving through a tight bend with no visibility, with the result that said driver is given the option to brake the motor vehicle. Here, first of all a warning information item is displayed visually to the driver. Subsequently, the information can additionally be emitted acoustically if the driver does not react to the visual warning information.

Currently available navigation devices in motor vehicles are designed to emit an alarm if a maximum permissible speed is exceeded. Here, the driver is usually directly warned visually or else additionally acoustically at the location of a traffic sign or the like which specifies the speed limit.

DE 10 2006 056 444 A1 describes a method for warning a driver of a vehicle, in which method two different warning signals are emitted, that is to say a warning signal of a first type and a warning signal of a second type. For example, the driver can first of all be notified of the excessive speed by way of a visual warning signal, and then acoustically in a time-delayed manner. As a result of the time delay, a warning of the driver can take place, which warning is graduated in accordance with the magnitude of the excessive speed.

Furthermore, DE 10 2008 020 488 A1 describes a navigation device for a motor vehicle, which navigation device gives the driver indications in a graduated manner that there is a speed limit in a section of road ahead. Thus, for example, a green arrow is indicated in a warning stage 1, which green arrow shows the driver visually that he is to initiate a braking operation. If the driver brakes, but not sufficiently, the color and the length of the arrow are changed in a warning stage 2. If the reduction in speed is still insufficient to adhere to the speed limit stipulation when the section of road is reached, the arrow is provided with an additional signal color and, for example, its length is changed further.

DE 10 2007 058 542 A1 describes a driver assistance system for monitoring the driving safety, in which driver assistance system a mobile navigation system emits an acoustic warning signal if a permissible speed is exceeded.

DE 10 2008 036 301 A1 describes an apparatus for detecting traffic information, an emitting unit emitting a warning signal if a detected maximum permissible speed of the vehicle is exceeded.

Furthermore, US 2007/0198160 A1 has disclosed a method for speed control, in which a warning signal is emitted as a consequence of an excessive speed.

The emitting of warning signals as a consequence of exceeding of a speed limit is occasionally considered to be disruptive by drivers.

SUMMARY

It is therefore one possible object to provide a method for warning a driver of a vehicle about exceeding of a speed limit which is particularly effective and at the same time is disruptive only to a small extent, in particular, and to provide a vehicle which is designed to carry out the method.

The inventors propose a method for warning a driver of a vehicle about exceeding of a speed limit, which comprises:
 a) determining of the presence of the speed limit and a driving speed of the vehicle;
 b) emitting of a warning signal of a first type if the driving speed of the vehicle is greater than the permissible driving speed according to the speed limit, the warning signal of the first type being emitted when a location is passed, from which location the speed limit is valid;
 c) determining of a reaction of the driver to the warning signal of the first type; and
 d) time-delayed emitting of a warning signal of a second type or suppression of the emitting of the warning signal of the second type depending on the reaction of the driver to the warning signal of the first type, a warning which can be discerned visually being emitted as warning signal of the first type and a warning which can be discerned acoustically being emitted as warning signal of the second type, and the time delay being calculated according to the difference between the current driving speed of the vehicle and the permissible driving speed.

The reaction of the driver and his/her interaction with the vehicle are therefore taken into consideration in the case of the emitting of the warning signals. It can thus be ensured that the warning signal of the second type is emitted merely when it is necessary in order to reinforce the warning. Otherwise, the emitting of the warning signal of the second type is suppressed, and the driver does not feel disrupted by the emitting of the different warning signals.

This is based on the finding that a driver as a rule introduces the braking operation only gradually after he/she has perceived an instruction for a lower driving speed situated in a section of road ahead. The braking operation is usually ended only after the traffic sign or an element of the same type which specifies the speed limit. This behavior is based on the assumption that the driving speed of the vehicle will not be checked, for instance by a radar, immediately after the speed limit has come into force.

As a result of the time-delayed emitting of the warning signal of the second type, only that driver is additionally warned who continues to behave in a manner which is critical with respect to safety, that is to say who does not react or who does not react sufficiently to the warning signal of the first type. In contrast, the emitting of the warning signal of the first type has predominantly an informing character. The driver is therefore warned about exceeding of the speed limit in a manner which is particularly effective and at the same time disruptive to a particularly small extent.

It is therefore taken into consideration here that the driver as a rule is aware of the excessive speed and will change his/her driving behavior promptly. The warning strategy is therefore based to a particularly great extent on the prevalent driving behavior, and particularly high acceptance of said warning strategy is to be assumed. It can thus, in particular, be avoided largely that drivers who feel disrupted by a warning signal deactivate the warning completely, if possible.

The warning signal of the first type is emitted when a location is passed, from which location the speed limit is valid. Thus, for example, the driver is already warned by the warning signal of the first type at the moment he/she passes an erected traffic sign which specifies the speed limit. Thereupon, a reaction of the driver to the warning signal of the first type is waited for, with the result that the warning signal of the second type need be used only in a situation-dependent manner.

A warning which can be discerned visually is emitted as warning signal of the first type and a warning which can be discerned acoustically is emitted as warning signal of the second type. The warning which can be discerned visually or the visual warning is namely suitable in a particularly satisfactory manner for informing the driver in a way which is disruptive to a small extent. Only if the driver then continues to behave in a manner which is critical with respect to safety, that is to say does not exhibit a reaction to the warning which can be detected visibly, does the emitting of a warning sound take place in a time-delayed manner, that is to say of an acoustic warning which has a particularly pronounced warning character which draws the attention of the driver to it. Here, the time delay is calculated according to the difference between the current driving speed of the vehicle and the permissible driving speed.

In one advantageous refinement, the warning signal of the second type is emitted after a first time period if, after the emitting of the warning signal of the first type, the driver does not reduce the driving speed of the vehicle. As an alternative, the warning signal of the second type is emitted after a second, longer time period if, after the emitting of the warning signal of the first type, the driver reduces the driving speed of the vehicle.

The warning signal of the second type is therefore emitted at an earlier time if the driver maintains the elevated, impermissible driving speed or even increases it. In contrast, the warning signal of the second type is emitted at a later time if the driver brakes actively. The interaction of the driver with the vehicle is thus taken into consideration in a particularly satisfactory manner in the case of the emitting of the warning signals.

It has proved advantageous, furthermore, if the emitting of the warning signal of the second type is suppressed if, after the emitting of the warning signal of the first type, the driver changes the driving speed of the vehicle in such a way that, after a predefined driven distance has been covered, the driving speed of the vehicle corresponds to the permissible driving speed. If, therefore, the required reduction in speed can be expected in an appropriate time, the emitting of the second warning signal can advantageously be dispensed with completely and the driver can thus be disrupted to a particularly small extent. A lower number of alarms therefore occur overall.

In order to determine the presence of the speed limit, various data can be utilized. For instance, a traffic-sign detection device can be used. This makes it possible, in particular, to take into consideration traffic signs which indicate a speed limit and are erected merely for a short time, for instance in an area of roadworks. As a result, the warning of the driver can take place in a particularly satisfactory manner such that it is adapted to the respective situation.

In addition or as an alternative, data which are stored in a navigation system of the vehicle can be used during the determination as to whether there is a speed limit. Predictive journey data of this type are a further reliable source for the determination as to whether there is a speed limit.

It is very particularly advantageous, furthermore, if positional data are used which specify the location of a traffic sign which displays the speed limit, and which are transmitted to a detection device of the vehicle. In particular, the data inside the vehicle, namely which are present in the navigation system, can thus be complemented by data which are obtained by the utilization of the traffic-sign device and by the positional data which come from a data source outside the vehicle. As a result, the determination of the actual presence of the speed limit is particularly reliable. The number of faulty warnings and incorrect warnings can be reduced to a particularly pronounced extent.

The positional data can be transmitted from a further vehicle to the detection direction. For instance, the vehicle which is designed to warn the driver can utilize the data set of further vehicles or the detection of traffic signs which has been performed by the further vehicles. For example, the positional data of erected, physical traffic signs can be transmitted to the vehicle via car-to-car communication.

However, the positional data can also be obtained from a database outside the vehicle, for instance by an enquiry being sent to a database of this type or by the database which is outside the vehicle making the positional data available using a broadcast process. This is also advantageous with regard to the accuracy when determining the presence of the speed limit.

It has proven advantageous, furthermore, if a presence, determined by the traffic-sign detection device, of a traffic sign which displays the speed limit is aligned with the presence of a generally valid speed limit. It can thus be taken into consideration, for example, that maximum speeds apply in general on certain road types, even if no traffic sign is erected which specifies this explicitly. The maximum permissible speeds of 50 km/h in built-up areas and 100 km/h outside built-up areas which are valid in Germany are to be mentioned here by way of example. This is favorable with regard to the plausibility of the result of the traffic-sign detection.

In addition or as an alternative, data which specify the presence of the traffic sign which displays the speed limit can be aligned with the data which are stored in the navigation device and/or with the positional data which are transmitted to the vehicle. A fusion of this type of the fundamental data leads to particularly reliable determination of the presence of the speed limit.

The inventors also propose a vehicle that has a warning device for warning a driver of the vehicle about exceeding of a speed limit. The warning device is designed for emitting a warning signal of a first type and a warning signal of a second type. The vehicle also has at least one determining device for determining the presence of the speed limit and for determining a driving speed of the vehicle. Furthermore, a control device is provided, by which the emitting of the warning signal of the second type can be effected or can be suppressed depending on a reaction of the driver to the warning signal of the first type. The control device is designed to effect the emitting of the warning signal of the first type by way of the warning device when a location is passed, from which location the speed limit is valid. The warning device is designed to emit a warning which can be discerned visually as warning signal of the first type and to emit a warning which can be discerned acoustically in a time-delayed manner as warning signal of the second type, the time delay being calculated according to the difference between the current driving speed of the vehicle and the permissible driving speed. A vehicle of this type makes it possible to warn the driver about exceeding of a speed limit in a manner which is particularly effective and at the same time disruptive to a small extent.

The advantageous embodiments which are described for the method also apply to the vehicle, and vice versa.

The features and combinations of features described above in the description and the features and combinations of features described in the following text in the description of the figures and/or shown solely in the FIGURE can be used not only in the respectively specified combination, but also in other combinations or on their own, without departing from the scope of the proposals.

BRIEF DESCRIPTION OF THE DRAWINGS

These and other objects and advantages of the present invention will become more apparent and more readily appreciated from the following description of the preferred embodiments, taken in conjunction with the accompanying drawing of which:

The drawing shows a vehicle which is approaching a traffic sign which specifies a speed limit.

DETAILED DESCRIPTION OF THE PREFERRED EMBODIMENT

Reference will now be made in detail to the preferred embodiments of the present invention, examples of which are illustrated in the accompanying drawing, wherein like reference numerals refer to like elements throughout.

A vehicle 10 which is shown in the FIGURE has a navigation system 12. The navigation system 12 comprises a warning device 14 which can emit warning signals of different types. A determining device for instance in the form of a camera 16 makes it possible to detect traffic signs 18 or elements of the same type in the surroundings of the vehicle 10, which traffic signs 18 or elements specify a speed limit. The warning device 14 can also be a component of the determining device, that is to say of the camera 16 in the present case. The different warnings can therefore be emitted by the camera 16 and/or by the navigation system 12. The warning signals of the first and second types are symbolically represented with reference numerals 22 and 24, respectively.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide V. DIRECTV*, 69 USPQ2d 1865 (Fed. Cir. 2004).

The invention claimed is:

1. A method for warning a driver of a vehicle about exceeding a speed limit, comprising:
   determining the speed limit and a driving speed of the vehicle;
   emitting a warning signal of a first type if the driving speed of the vehicle is greater than the speed limit, the warning signal of the first type being emitted when a location is passed, from which location the speed limit is valid, the warning signal of the first type being a visual warning;
   determining a reaction of the driver to the warning signal of the first type; and
   emitting with a time delay, a warning signal of a second type if the vehicle continues to exceed the speed limit after the warning signal of the first type, the warning signal of the second type being an audible warning, the time delay being calculated according to a difference between a current driving speed of the vehicle and the speed limit.

2. The method according to claim 1, wherein the warning signal of the second type:
   is emitted after a first time period if, after emitting the warning signal of the first type, the driver does not reduce the driving speed of the vehicle, or
   is emitted after a second time period, longer than the first time period if, after emitting the warning signal of the first type, the driver reduces the driving speed of the vehicle.

3. The method according to claim 2, wherein emitting the warning signal of the second type is suppressed if, after the second time period, the driving speed of the vehicle is less than or equal to the speed limit.

4. The method according to claim 3, wherein the second time period has a length corresponding to a difference between the speed limit and the driving speed of the vehicle when the warning signal of the first type was emitted.

5. The method according to claim 1, wherein emitting the warning signal of the second type is suppressed if, after the emitting of the warning signal of the first type, the driver reduces the driving speed of the vehicle in such a way that, after a predefined driven distance has been covered, the driving speed of the vehicle is less than or equal to the speed limit.

6. The method according to claim 1, wherein the speed limit is determined by at least one of:
   a traffic-sign detection device,
   data stored in a navigation system of the vehicle, and
   positional data which specify a location of a speed limit traffic sign, and which are transmitted to the vehicle.

7. The method according to claim 6, wherein the positional data are transmitted to the vehicle of the driver from a further vehicle.

8. The method according to claim 6, wherein the positional data are obtained from a database outside the vehicle.

9. The method according to claim 6, wherein the speed limit is determined by:
   using a traffic-sign detection device to detect a speed limit traffic sign which displays the speed limit, and
   confirming that the speed limit displayed by the speed limit traffic sign conforms to a generally valid speed limit for current driving conditions.

10. The method according to claim 6, wherein the speed limit is determined by:
    using a traffic-sign detection device to detect a speed limit traffic sign which displays the speed limit, and
    confirming that the speed limit displayed by the speed limit traffic sign conforms to transmitted positional data and posted speed limit data stored in the navigation system.

11. The method according to claim 1, wherein the warning signal of the first type is emitted when the vehicle is proximate to a speed limit traffic sign.

12. The method according to claim 1, wherein the warning signal of the second type is emitted concurrently with a warning signal of a third type, the warning signal of the third type being a visual warning.

13. A vehicle comprising:
    a warning device to warn a driver of the vehicle about exceeding a speed limit, the warning device having an emission unit to emit a warning signal of a first type and a warning signal of a second type, the warning signal of the first type being a visual warning, the warning signal of the second type being an audible warning; and
    a determining device to determine the speed limit and a driving speed of the vehicle;
    a control device to cause the warning device to emit the warning signal of the first type when a location is passed, from which the speed limit is valid, and, if the vehicle continues to exceed the speed limit after the warning signal of the first type, to cause the warning device to emit the warning signal of the second type with a time delay, the time delay being calculated according to a difference between a current driving speed of the vehicle and the speed limit.

\* \* \* \* \*